United States Patent [19]

Harries

[11] 3,995,913
[45] Dec. 7, 1976

[54] ACTUATOR ASSEMBLIES FOR VEHICLE HYDRAULIC BRAKING SYSTEMS

[75] Inventor: David Anthony Harries, Solihull, England

[73] Assignee: Girling Limited, Birmingham, England

[22] Filed: Dec. 11, 1975

[21] Appl. No.: 639,872

[30] Foreign Application Priority Data

Dec. 17, 1974 United Kingdom .............. 54554/74
Apr. 24, 1975 United Kingdom .............. 17105/75

[52] U.S. Cl. ............................ 303/21 F; 251/30
[51] Int. Cl.² ......................................... B60T 8/00
[58] Field of Search ......... 303/21 F, 21 AF, 61–63, 303/68–69, 92, 113, 115, 119; 188/181; 137/627.5; 251/30

[56] References Cited
UNITED STATES PATENTS

| | | | |
|---|---|---|---|
| 3,694,038 | 9/1972 | Ingram et al. | 303/21 F |
| 3,746,402 | 7/1973 | Hickner et al. | 303/21 F |
| 3,830,550 | 8/1974 | Kondo | 303/21 F |
| 3,920,279 | 11/1975 | Ihada et al. | 303/21 F |
| 3,936,095 | 2/1976 | Every | 303/21 F |

Primary Examiner—Trygve M. Blix
Assistant Examiner—Jesus D. Sotelo
Attorney, Agent, or Firm—Scrivener, Parker, Scrivener and Clarke

[57] ABSTRACT

In a pneumatically-operable actuator assembly for a vehicle hydraulic braking system a control valve assembly comprises a first valve responsive to a signal of deceleration for controlling communication between an inlet passage for connection to a supply of air under pressure and a modulator chamber through a supply chamber, and a second valve downstream of the first valve for controlling communication between the modulator chamber and an exhaust passage and responsive to pressure in the supply chamber, the first valve being substantially smaller than the second valve whereby the pressure in the modulator chamber can be reduced rapidly in response to a relatively small reduction in the pressure in the supply chamber.

15 Claims, 6 Drawing Figures

ACTUATOR ASSEMBLIES FOR VEHICLE HYDRAULIC BRAKING SYSTEMS

SPECIFIC DESCRIPTION

This invention relates to pneumatically-operable actuator assemblies being of the kind in which a supply of hydraulic fluid from an hydraulic master cylinder to at least one hydraulic slave cylinder of a wheel brake is regulated by means of at least one modulator assembly having a chamber communicating with the master cylinder and an outlet port for connection to the slave cylinder, and an expander piston working in a bore communicating with the chamber and movable between a first advanced position in which the effective volume of the chamber is at a minimum and a valve between the master cylinder and the outlet port is open, and a second retracted position in which the valve is closed and the effective volume of the chamber is larger, the expander piston normally being disposed in the first position but movable into the second position when the deceleration of a braked wheel operated by the slave cylinder exceeds a predetermined value, the position of the expander piston being controlled by pneumatic pressure in a modulator chamber which pressure is in turn determined by a control valve assembly responsive to a signal from deceleration sensing means.

In one known actuator assembly of the kind set forth for vehicle braking systems pneumatic pressure in the modulator chamber normally holds the modulator member in an advanced operative postion so that the expander piston is in turn held in its advanced position. When the wheel operated by the brake skids, the deceleration sensing means are operative to operate the valve-assembly which cuts off the supply of fluid pressure to the modulator chamber and dumps or otherwise exhausts that pressure from the modulator chamber so that the modulator member moves into a retracted position and the expander piston is permitted to move into its second retracted position.

In such known pneumatic-operable actuating assemblies difficulty is experienced in dumping or otherwise exhausting the pneumatic pressure acting on the modulator member with sufficient rapidity, in response to operation of the deceleration sensing means, to enable the expander piston to move quickly into its retracted position.

According to our invention in a pneumatically-operable actuator assembly of the kind set forth for a vehicle hydraulic braking system the control valve assembly comprises a first valve responsive to the signal for controlling communication between an inlet passage for connection to a supply of air under pressure and the modulator chamber through a supply chamber, and a second valve downstream of the first valve for controlling communication between the modulator chamber and an exhaust passage and responsive to pressure in the supply chamber, the arrangement being such that when the signal is inoperative the first valve is in an open position in which the inlet passage is in communication with the supply chamber and the pressure in the supply chamber holds the second valve in a closed position in which the modulator chamber is isolated from the exhaust passage and, when the signal is operative, the second valve isolates the inlet passage from the supply chamber and reduces the pressure in the supply chamber so that the second valve can move away from the closed position to place the modulator chamber in communication with the exhaust passage, the first valve being substantially smaller than the second valve whereby the pressure in the modulator chamber can be reduced rapidly in response to a relatively small reduction in the pressure in the supply chamber.

When the first valve is in its open position the supply chamber is isolated from exhaust means which may comprise an outlet passage in a housing for the valves, or a passage through the first valve which communicates with the exhaust passage itself.

The first valve comprises a first member alternatively engagable with a first seating surrounding the inlet passage and a second seating surrounding the exhaust means, and the second valve comprises a second valve member alternatively engagable with a third seating surrounding the supply chamber and a fourth seating surrounding the exhaust passage, in which the first valve member is spaced from the first seating and engages the second when the first valve is in the open position, and the second valve member engages with the fourth seating and is spaced from the third when the second valve is in the closed position.

The first valve member is of rigid construction and is moveable towards the first seating by means of a solenoid which is energised by the signal, and the second valve member comprises a pressure-responsive diaphragm which is separate from the first valve member.

The valve members may be spaced inwardly from each other with the first and second seatings spaced radially from the third and fourth seatings. However, in a preferred construction, the two valve members are disposed side-by-side in close proximity with the second valve member being engageable with the fourth seating which surrounds an opening in the diaphragm, the opening communicating at all times with the exhaust passage.

Movement of the expander piston into the retracted position is accomplished by the provision of a compression spring which is held in a compressed condition when the modulator chamber is pressurised and which extends when the pressure in the modulator chamber is reduced. This also occurs when the supply of fluid pressure in the inlet passage fails so that, under such circumstances, the wheel brake can not be applied, or at least the pressure applied to the slave cylinder is relieved.

Preferably, therefore the actuator assembly incorporates a safety device which is operative upon failure of the supply of fluid pressure in the inlet passage to hold the expander piston in the first advanced position against the force in the compression spring which acts in the opposite direction normally to urge the expander piston into the second retracted position in response to reduction in the pressure in the modulator chamber.

Preferably the safety device comprises a casing in which a pressure-responsive movable member is disposed and the movable member is normally held in a retracted position against the force in a safety spring by the supply of fluid pressure, and the movable member carries an operating rod which acts on the expander piston to hold it in its advanced position upon failure of the supply of fluid pressure and release of energy in the safety spring.

Some embodiments of our invention are illustrated in the accompanying drawings in which.

Figure 1:
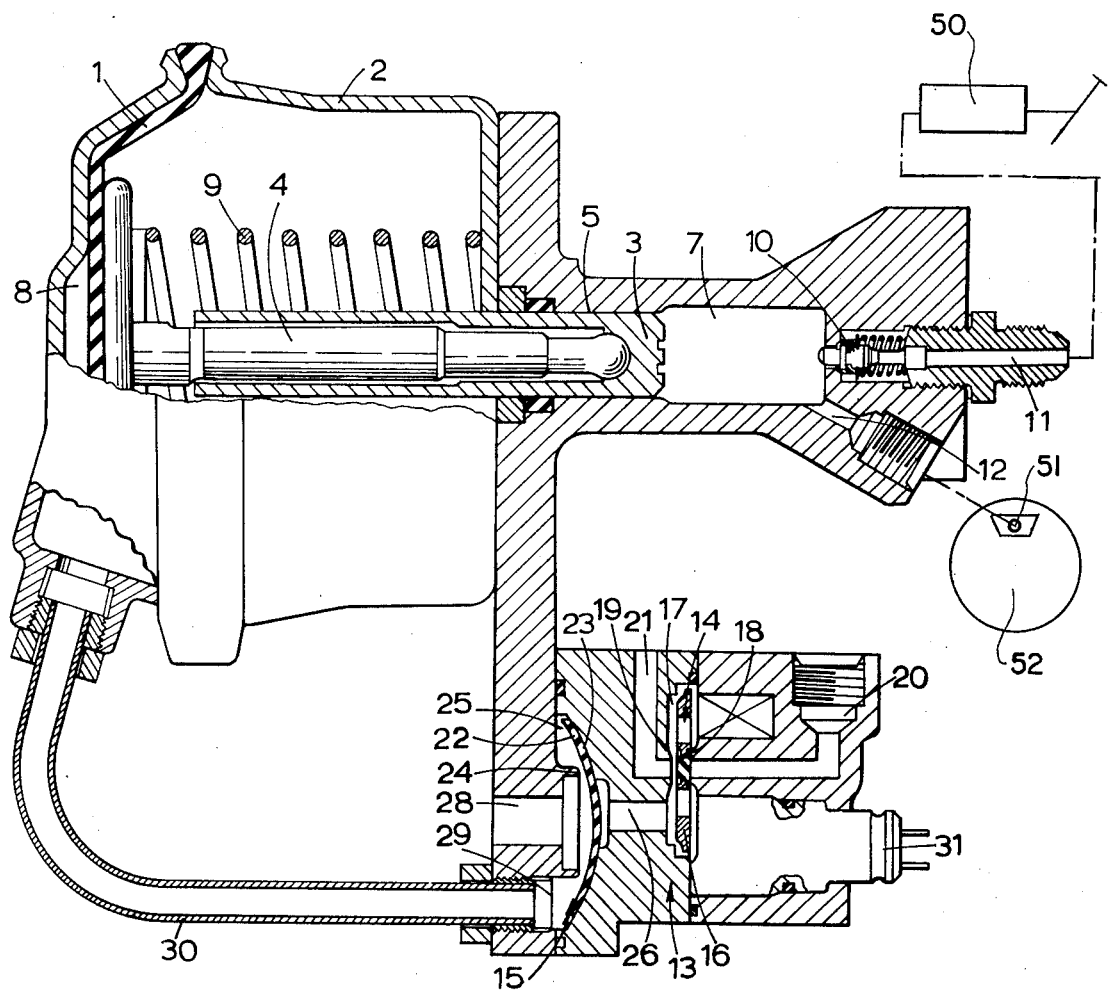
FIG. 1 is a part longitudinal section through a pneumatically-operable actuator assembly for a vehicle hydraulic braking system with the modulator member in a retracted position.
Figure 2:
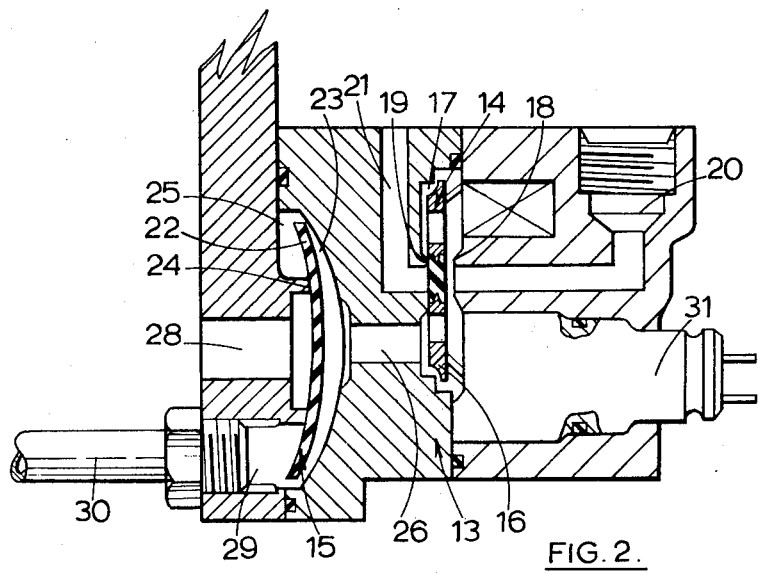
FIG. 2 is a longitudinal section through the control valve assembly showing the relative positions of the parts when the modulator piston is in the advanced position.

In the pneumatically-operable actuator assembly illustrated in FIGS. 1 and 2 of the accompanying drawings a modulator member 1 comprises a flexible diaphragm sealed at its peripheral edge into a housing 2 and acting on an expander piston 3 through a headed thrust member 4. The expander piston 3 works in a bore 5 at one end of the housing 2, the bore 5 communicating with a chamber 7 of which the effective volume varies depending upon the axial position of the expander piston 3. Normally the expander piston 3 is held in an operative advanced position in which the volume of the chamber 7 is at a minimum by pneumatic pressure which is admitted to a modulator chamber 8 in the housing 2 so that the face of the diaphragm 1 remote from the expander piston 3 is subjected to the pneumatic pressure. In this position a compression return spring 9 for urging the expander piston 3 in the opposite direction is compressed, and the expander piston 3 engages with a spring-loaded valve 10 in the end of the housing 2 to hold the valve 10 open so that high pressure hydraulic fluid from a master cylinder 50 can be supplied from a connection 11 on the upstream side of the valve 10 to an outlet port 12 for connection to a slave cylinder 51 of a wheel brake.

The supply of fluid pressure to the chamber 8 is controlled by a solenoid-operated control valve assembly 13 comprising a first valve 14 and a second valve 15 in tandem. The first valve comprises a plate valve member 16 located in a chamber 17 for alternative engagement with axially spaced first and second seatings 18 and 19 disposed respectively between an inlet passage 20 for connection to a source of pneumatic pressure, conveniently compressed air, and the chamber 17, and between the chamber 17 and an outlet passage 21 for connection, for example, to a reservoir. The second valve comprises a valve member 22 in the form of a diaphragm which is engageable alternating with third and fourth axially spaced seatings 23 and 24 respectively. The third seating 23 is of arcuate or past-spherical outline is of substantial area, and is disposed between a chamber 25 in which the valve member 22 is located and an axial supply passage 26 communicating with the chamber 17 and defining with the chamber 17 a supply chamber. The second seating 24 comprises an annular projection extending into the chamber 25 and surrounding an exhaust passage 28. An axial passage 29 spaced radially from the passage 28 and located at the outer edge of the seating 23 provides communication between the chamber 25 and the chamber 8 through a pipe-line 30.

A solenoid 31 is adapted to be energised by a signal from wheel deceleration sensing means to urge the plate valve member 16 into engagement with the seating 18. The solenoid is normally de-energised so that pressure in the inlet passage 20 urges the plate valve member 16 into engagement with the seating 19. Thus fluid pressure is supplied to the chamber 25 and acts on the diaphragm 22 to urge it into engagement with the seating 24. This places the chamber 25 in direct communication with the chamber 8 to hold the expander piston 3 in the advanced position as described above.

When the signal from the deceleration sensing means energises the solenoid the plate valve member 16 is urged into engagement with the seating 18 to isolate the pressure 20 from the chamber 17, and the pressure in the chamber 25 and the supply passage 26 exhausts through the outlet passage 21 with simultaneous movement of the diaphragm 22 into engagement with the valve seating 23 in response to the pressure in the chamber 8 which is then exhausted to atmosphere through the exhaust passage 28 with the compression spring 9 urging the diaphragm 1 into the retracted position illustrated in FIG. 1. This in turn permits the expander piston 3 to move into a retracted position initially allowing the valve 10 to close and thereafter to increase the effective volume of the chamber 7.

Since the passage 28 can be relatively large in area in comparison with the passage 26, relief of the pressure in the chamber 8 occurs rapidly and commences the instant the diaphragm 22 moves away from the seating 24, although at that instant it may only be engaging with the seating 23 at least at its peripheral edge (FIG. 1).

Also, since the passage 20, the supply passsage 26, and the valve seating 18 are all smaller in area than the pressure relief passage 28 the axial passage 29, and the seating 24, re-application of the brake is gradual. This has the advantage that re-application of the brakes is unlikely to occur prematurely following a skid.

Furthermore, the solenoid 31 is small and compact.

Figure 3:
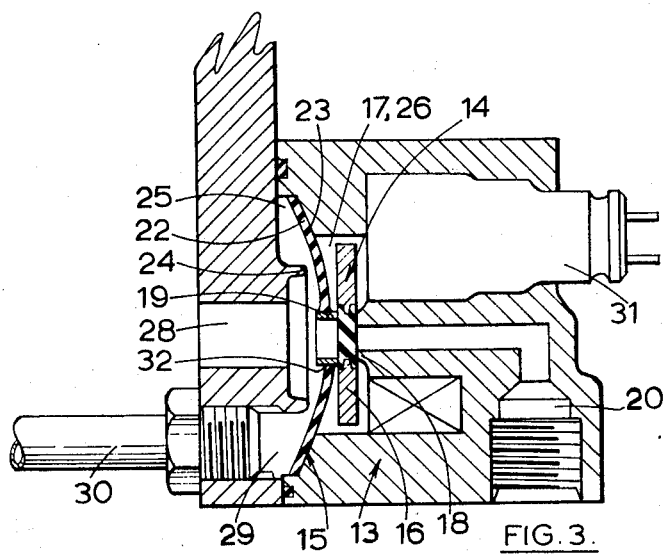
FIG. 3 shows a modified control valve assembly.

In the modified construction illustrated in FIG. 3 the valve seating 10 comprises an annulus surrounding an opening 32 in the centre of the diaphragm 22. This has the advantage that the outlet passage 21 can be eliminated by utilising the exhaust passage 28 with which the supply passage 26 communicates when the seating 19 is spaced from the valve member 16. Also the overall area of the seating 23 reduced at its centre to define the chamber 17 which is combined with the supply passage 26.

The construction and operation of the embodiment of FIG. 3 is otherwise the same as that of FIGS. 1 and 2, and corresponding reference numerals have been applied to corresponding parts.

Figure 4:
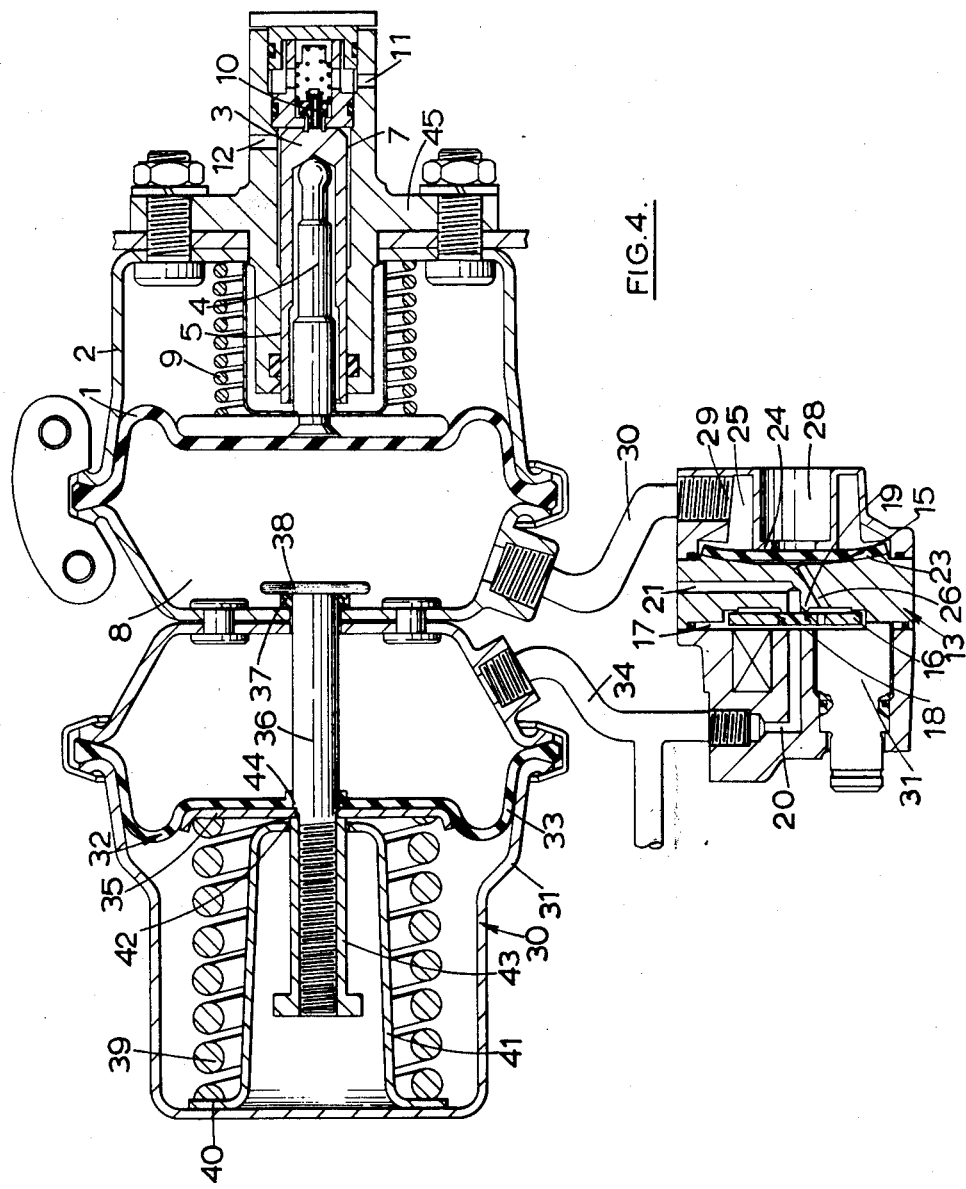
FIG. 4 is a longitudinal section through an actuator assembly for a vehicle hydraulic braking system similar to FIGS. 1 and 2 but including a safety device.
Figure 5:
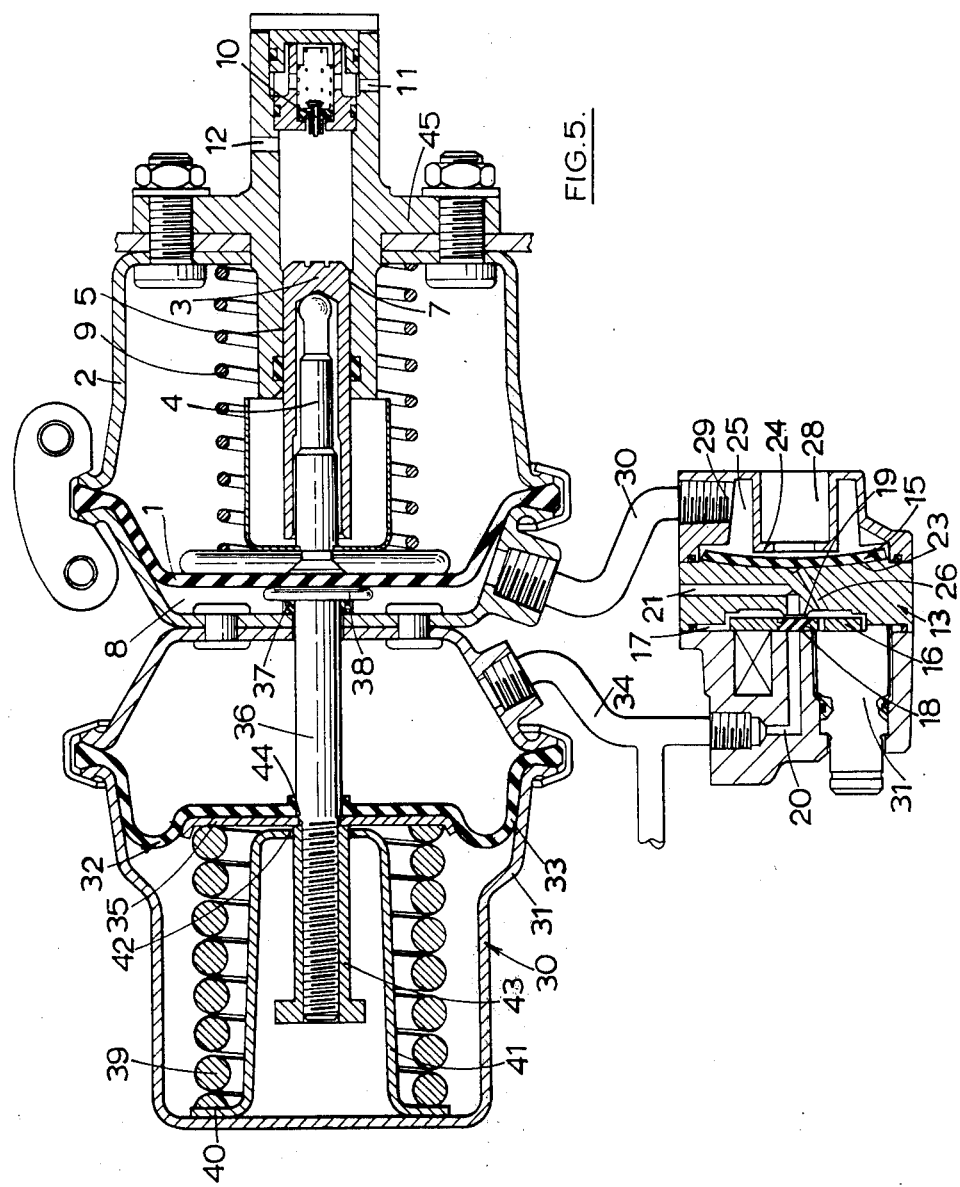
FIG. 5 is a view similar to FIGS. 4 with the expander piston in the retracted position.
Figure 6:
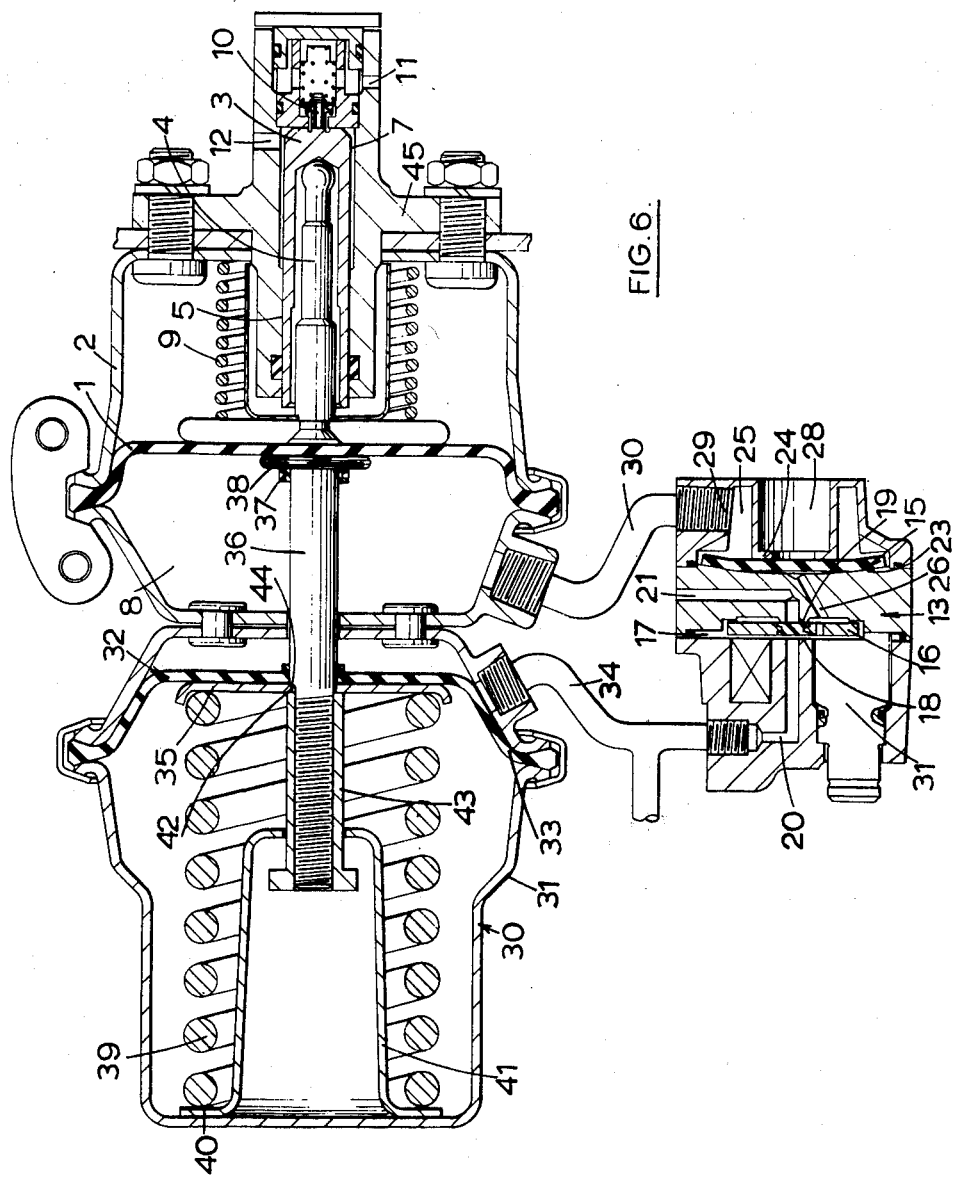
FIG. 6 is a view similar to FIGS. 4 and 5 showing the relative positions assumed by the components upon failure of the supply of fluid pressure.

In the actuator assembly illustrated in FIGS. 4 to 6 of the drawings a safety device 30 comprises a casing 31 which is mounted on the end of the housing 2 remote from the expander piston 3. The casing 31 accommodates a pressure-responsive movable member 32 comprising a flexible diaphragm 33 sealings connected at its peripheral edge to the wall of the casing and exposed on the side adjacent to the housing 2 to pneumatic pressure in a conduit 34 through which the pneumatic pressure is supplied to the inlet passage 20 of the control valve assembly 13. The diaphragm 33 is backed by a rigid plate 35 which carries an operating rod 36 projecting into the chamber 8 in the housing 2 through aligned openings in the housing 2 and the casing 31, and a seal 37 located within the housing 2. The free end of the operating rod 36 is provided with an enlarged head 38 normally engaging with the seal 37 to provide a stop.

A safety compression spring 39 which is stronger than the spring compression spring 39 which is stronger than the spring 9 acts between the plate 35 and an abutment 40 clamped against the free end of the casing 31. The abutment comprises an outwardly directed flange at one end of the thimble 41, of top-hat outline, and the opposite end is provided with an opening 42 through which is guided a threaded sleeve 43 screwed onto the operating rod 36 to clamp the plate 35 against a shoulder 44 on the rod 36.

As shown in FIGS. 1 and 2, when the supply of pneumatic pressure is operative, the operating rod 36 is held in a retracted position against the force in the safety spring 39 which is compressed by the pressure acting on the diaphragm 33. Upon failure of the supply of fluid pressure the safety spring 39 advances the operating rod 36 so that the head 38 engages the modulator member 1 to urge the expander piston 3 into its operative advanced position against the force in the return spring 9. Thus the valve 10 is held open so that high pressure hydraulic fluid from the master cylinder can still be supplied to the wheel brake, irrespective of the supply of fluid pressure.

In the construction described above the housing 2 is detachably secured to the flange of a cylinder 45 containing the bore 5 in which the expander piston 3 works, and the cylinder 45 is separate from the control valve assembly 13. This has the advantage of facilitating installation since the control valve assembly 13 can be located in any covenient position, and the wall of the housing 2 can be assembled with the casing 31, after the cylinder 45 is in position.

The construction and operation of the embodiment described above is otherwise the same as the construction described with reference to FIGS. 1 and 2 of the accompanying drawings and corresponding reference numerals have been applied to corresponding parts.

I claim:

1. A pneumatically-operable actuator assembly for a vehicle braking system of the type comprising an hydraulic master cylinder for supplying hydraulic fluid under pressure to at least one hydraulic slave cylinder of a wheel brake, and a valve between said master cylinder and said slave cylinder, the actuator assembly comprising at least one modulator assembly comprising a housing having a chamber for communication with the master cylinder, an outlet port for connection to the slave cylinder, and a bore communicating with said chamber and in which works an expander piston movable between a first advanced position in which the effective volume of said chamber is at a minimum and said valve is open and a second retracted position in which said valve is closed and the effective volume of said chamber is larger, said expander piston being disposed in said first position but movable into said second position when the deceleration of a braked wheel operated by the slave cylinder exceeds a predetermined value, said housing also having a modulator chamber adapted to be pressurized by pneumatic pressure to control the position in said bore of said expander piston, and a control valve assembly responsive to a signal from deceleration sensing means for controlling said pneumatic pressure in said modulator chamber, wherein said control valve assembly comprises a body having an inlet passage for connection to a supply of air, a supply chamber through which said inlet passage is connected to said modulator chamber, and an exhaust passage, a first valve responsive to the said signal for controlling communication between said inlet passage and said supply chamber, and a second valve downstream of said first valve and responsive to pressure in said supply chamber to control communication between said modulator chamber and said exhaust passage, the arrangement being such that when the said signal is inoperative said first valve is in an open position in which said inlet passage is in communication with said supply chamber and pressure in said supply chamber holds said second valve in a closed position in which said modulator chamber is isolated from said exhaust passage, and when the said signal is operative said second valve isolates said inlet passage from said supply chamber and reduces said pressure in said supply chamber so that said second valve can move away from said closed position to place said modulator chamber in communication with said exhaust passage, said first valve being substantially smaller than said second valve whereby said pressure in said modulator chamber can be reduced rapidly in response to a relatively small reduction in said pressure in said supply chamber.

2. An actuator assembly as claimed in claim 1, including exhaust means from which said supply chamber is isolated when said first valve is in the said open position.

3. An actuator assembly as claimed in claim 2, wherein said exhaust means comprises an outlet passage in said body.

4. An actuator assembly as claimed in claim 2, wherein said exhaust means comprises a passage through said first valve which communicates with said exhaust passage itself.

5. An actuator assembly as claimed in claim 2, wherein said first valve comprises a first seating surrounding said inlet passage, a second seating surrounding said exhaust means and a first valve member alternatively engageable with said first and second seatings, and said second valve comprises a third seating surrounding said supply chamber, a fourth seating surrounding said exhaust passage and a second valve member alternatively engagable with said third and fourth seatings, and first valve member is spaced from said first seating and engages said second seating when said first valve is in the said open position, and said second valve member engages with said fourth seating and is spaced from said third seating when said second valve is in the said closed position.

6. An actuator assembly as claimed in claim 5, wherein a solenoid is adapted to be energised by the said signal and said first valve member is of rigid construction and is movable towards said first seating by said solenoid when said solenoid is energised, and said second valve member comprises a pressure-responsive diaphragm which is separate from said first valve member.

7. An actuator assembly as claimed in claim 6, wherein said two valve members are disposed side-by-side in close proximity and said diaphragm has an opening which said fourth seating surrounds, said opening communicating at all times with said exhaust passage.

8. An actuator assembly as claimed in claim 5, wherein said valve members are spaced inwardly from each other with said first and second seatings spaced radially from said third and fourth seatings.

9. An actuator assembly as claimed in claim 5, wherein said third seating is of substantial area in comparison with said fourth seating, and said exhaust passage is of substantial area in comparison with the area of said supply chamber.

10. An actuator assembly as claimed in claim 5, wherein said third seating is of arcuate outline.

11. An actuator assembly as claimed in claim 5, wherein said third seating is of part-spherical outline.

12. A pneumatically-operable actuator assembly for a vehicle braking system of the type comprising an hydraulic master cylinder for supplying hydraulic fluid under pressure to at least one hydraulic slave cylinder of a wheel brake, and a valve between said master cylinder and said slave cylinder, the actuator assembly comprising at least one modulator assembly comprising a housing having a chamber for communication with the master cylinder, an outlet port for connection to the slave cylinder, and a bore communicating with said chamber and in which works an expander piston movable between a first advanced position in which the effective volume of said chamber is at a minimum and said valve is open and a second retracted position in which said valve is closed and the effective volume of said chamber is larger, said expander piston being disposed in said first position but movable into said second position when the deceleration of a braked wheel operated by the slave cylinder exceeds a predetermined value, said housing also having a modulator chamber adapted to be pressurised by pneumatic pressure to control the position in said bore of said expander piston, and a control valve assembly responsive to a signal from deceleration sensing means for controlling said pneumatic pressure in said modulator chamber, wherein said control valve assembly comprises a body having an inlet passage for connection to a supply of air, a supply chamber through which said inlet passage is connected to said modulator chamber, and an exhaust passage, a first valve responsive to the said signal for controlling communication between said inlet passage and said supply chamber, and a second valve downstream of said first valve and responsive to pressure in said supply chamber to control communication between said modulator chamber and said exhaust passage, the arrangement being such that when the said signal is inoperative said first valve is in an open position in which said inlet passage is in communication with said supply chamber and pressure in said supply chamber holds said second valve in a closed position in which said modulator chamber is isolated from said exhaust passage and when the said signal is operative, said second valve isolates said inlet passage from said supply chamber and reduces said pressure in said supply chamber so that said second valve can move away from said closed position to place said modulator chamber in communication with said exhaust passage, said first valve being substantially smaller than said second valve whereby said pressure in said modulator chamber can be reduced rapidly in response to a relatively small reduction in said pressure in said supply chamber, and further incorporating a compression spring for moving said expander piston into said retracted position but normally held in a compressed condition when said modulator chamber is pressurized, and wherein said actuator assembly also incorporates a safety device which is operative upon failure of said supply of fluid pressure in said inlet passage to hold said expander piston in said first advanced position against the force in said compression spring which acts in the opposite direction normally to urge said expander piston into said second retracted position in response to reduction in said pressure in said modulator chamber.

13. An actuator assembly as claimed in claim 12 wherein said safety device comprises a casing, a pressure-responsive movable member in said casing, and a safety spring acting on said movable member which is normally held in a retracted position against the force in said safety spring by the supply of fluid pressure, said movable member carrying an operating rod which acts on said expander piston to hold said expander piston in the said advanced position upon failure of said said safety spring.

14. An actuator assembly as claimed in claim 13, wherein said operating rod has an enlarged head acting on said expander piston and a face seal through which said rod works is clamped between said head and said casing when said movable member is in said retracted position.

15. An actuator assembly as claimed in claim 12, wherein said safety spring comprises a second compression spring which is stronger than said compression spring acting on said expander piston.

* * * * *